US011780660B2

(12) United States Patent
Mir

(10) Patent No.: US 11,780,660 B2
(45) Date of Patent: Oct. 10, 2023

(54) PACKAGING FOR COOKING FOOD

(71) Applicant: Nazir Mir, Somerset, NJ (US)

(72) Inventor: Nazir Mir, Somerset, NJ (US)

(*) Notice: Subject to any disclaimer, the term of this patent is extended or adjusted under 35 U.S.C. 154(b) by 0 days.

(21) Appl. No.: 16/532,469

(22) Filed: Aug. 5, 2019

(65) Prior Publication Data
US 2021/0039855 A1 Feb. 11, 2021

(51) Int. Cl.
| B65D 65/00 | (2006.01) |
| B65D 65/40 | (2006.01) |
| B65D 81/34 | (2006.01) |
| B65D 81/20 | (2006.01) |
| A47J 36/02 | (2006.01) |
| B32B 27/08 | (2006.01) |
| B32B 27/32 | (2006.01) |
| B32B 27/36 | (2006.01) |
| B65D 33/01 | (2006.01) |

(52) U.S. Cl.
CPC .......... *B65D 65/403* (2013.01); *A47J 36/027* (2013.01); *B32B 27/08* (2013.01); *B32B 27/32* (2013.01); *B32B 27/36* (2013.01); *B65D 33/01* (2013.01); *B65D 81/2084* (2013.01); *B65D 81/3438* (2013.01); *B65D 81/3446* (2013.01); *B32B 2439/70* (2013.01); *B65D 2205/02* (2013.01)

(58) Field of Classification Search
CPC .. B65D 65/403; B65D 33/01; B65D 81/2084; B65D 81/3438; B65D 81/3446; B65D 2205/02; A47J 36/027; B32B 27/08; B32B 27/32; B32B 27/36; B32B 2439/70

USPC .......................................................... 383/103
See application file for complete search history.

(56) References Cited

U.S. PATENT DOCUMENTS

| 4,672,684 A * | 6/1987 | Barnes .................. B65D 31/04 383/45 |
| 4,874,620 A * | 10/1989 | Mendenhall .......... B65D 33/01 426/118 |
| RE33,880 E * | 4/1992 | Yamazaki .............. B65D 31/02 493/228 |
| 5,492,705 A * | 2/1996 | Porchia .................. B65D 33/01 426/106 |
| 6,541,086 B2 * | 4/2003 | Moteki .................. B32B 3/266 229/87.08 |
| 7,481,581 B2 * | 1/2009 | Oshima .............. B65D 75/5805 383/200 |
| 8,087,827 B2 * | 1/2012 | Mir ....................... A47J 36/027 383/102 |
| 9,016,944 B2 * | 4/2015 | Mir ........................ B65D 33/01 383/102 |
| 9,199,781 B2 * | 12/2015 | Bosman ............... B65D 77/225 |

(Continued)

*Primary Examiner* — Peter N Helvey
(74) *Attorney, Agent, or Firm* — Rueppell Law; Chris Rueppell

(57) ABSTRACT

A packaging device including a breathable or non-breathable, microwavable composite film structure in the form of a bag, a tray or other type of container is disclosed. The device may include atmospheric control attributes in the form of microperforations, and steam venting mechanisms in the form of precision cuts or channels. The microperforations may form atmospheric conditions within the device for the storage of perishable and/or respiring food products, and the steam venting mechanisms may regulate the pressure and/or heat within the device during microwave cooking of the food products within.

20 Claims, 5 Drawing Sheets

(56) References Cited

U.S. PATENT DOCUMENTS

| | | | |
|---|---|---|---|
| 2004/0191476 A1* | 9/2004 | Wallen | B32B 27/08 |
| | | | 428/137 |
| 2006/0037884 A1* | 2/2006 | Doyle | B65B 61/02 |
| | | | 206/524.8 |
| 2007/0263948 A1* | 11/2007 | Buchman | B65D 33/01 |
| | | | 383/103 |
| 2009/0052813 A1* | 2/2009 | Grosse-Heitmeyer | |
| | | | B31B 70/00 |
| | | | 383/101 |
| 2011/0179754 A1* | 7/2011 | Utz | B65D 77/225 |
| | | | 53/467 |
| 2012/0196060 A1* | 8/2012 | Hansen | B32B 3/28 |
| | | | 428/34.8 |
| 2013/0077895 A1* | 3/2013 | Jian | B65D 33/007 |
| | | | 383/45 |
| 2014/0233868 A1* | 8/2014 | Knutzon | B65D 31/12 |
| | | | 383/40 |
| 2015/0274406 A1* | 10/2015 | Balasubramanian | A23B 7/152 |
| | | | 426/312 |
| 2015/0366230 A1* | 12/2015 | Malefyt | B65B 31/04 |
| | | | 426/323 |
| 2016/0101916 A1* | 4/2016 | Grijalva Varillas | B32B 5/22 |
| | | | 383/102 |
| 2016/0185504 A1* | 6/2016 | Ito | B65D 65/38 |
| | | | 383/103 |

* cited by examiner

PACKAGING FOR COOKING FOOD

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

The current invention generally relates to the field of packaging for food products, including a functional package and method for packaging perishable food products, to allow respiration thereby increasing shelf life and optimizing food product life, to provide the food product in a higher quality and ready-to-eat form and provide them in all possible consumer preferred convenient formats. The current invention also relates to packaging to facilitate microwavable steam cooking of frozen and non-frozen (fresh) food products.

BACKGROUND OF THE INVENTION

Fruits, vegetables and other types of food have become more popular as consumers have become more health conscious. Health benefits associated with regular consumption of fresh fruits and vegetables such as blueberries, cranberries, strawberries, apple, carrots, broccoli and tomato are generally well recognized. (Clemens, 2015; Nile & Park, 2014.)

Health-conscious consumers are increasingly spending more on fresh produce, and are buying new value-added fresh produce products. (Wismer, 2014.) Consumers also prefer convenience, and ability to provide fresh, high-quality produce, with a safe, convenient and easy method of cooking, makes the product much more appealing. Value-added food product, according to USDA, would include any product with "a change in the physical state or form of the product". Value-added fresh-produce products include fresh-cut fruits and vegetables, such as carrots, broccoli, cauliflower, corn, leafy greens, strawberries, blueberries, apple, grapes, cranberries, etc. The value-added benefits include, providing the ready-to-eat or not ready-to-eat food product in stand-up pouches or trays with easy peel lids that are convenient to handle, which may allow the consumer to eat the product while still within the package, adding a breathable function to the package, where necessary, to improve quality and maintain safety and providing the ability to cook the food product in a microwave oven. All these benefits provide consumers with convenience.

The US market for value-added, fresh vegetable and fruit products was recently valued at $104.7 billion. (Grand-View-Research, 2018.) These value-added products comprise the most rapidly growing segment of the fresh produce industry, as well as one of the most rapidly growing categories in the supermarket and food service markets. This growth is evidenced by the following: (i) value-added produce represents about 17% of total produce department sales; (ii) sales of value-added fruits and vegetables increased by more than 8% and 10%, respectively, from 2011 to 2015, (Cook, 2016), and (iii) retail sales of packaged salads increased 8% to $3.7 billion from 2015 to 2016. (Watson, 2016.)

Furthermore, the percentage of health-conscious consumers is increasing, as more and more consumers demand healthier, safer and environmentally friendly food products. Concurrently, consumers have recognized the benefits of the functional properties of produce, such as lycopene in tomato and other anti-carcinogenic compounds in many fruits and vegetables.

Beyond increased consumer demand based on health benefits, consumer demand for fresh fruits and vegetables has also been driven by the demand for high quality, variety and convenience. (Schouten, 2017.) The explosion in produce department offerings in supermarkets evidences this trend. For example, the entry of premium-priced greenhouse vegetable products into US supermarkets from Spain, Israel, The Netherlands and Canada indicate that consumers are looking for premium-quality produce and are willing to pay the associated premium price. (Kristy Plattner, Agnes Perez, & Thornsbury, 2014; USDA-ERS, 2018.) As described previously, this growing market demand has resulted in the fresh-cut fruit and vegetable industry experiencing significant growth over the past few years.

A major reason for the increased consumption of fresh fruits and vegetables is their improved quality at the time they are provided to the consumer in a supermarket or other retail location. It should be noted that, after food products are packaged, they are typically distributed by trucks or other forms of transportation, and then stored before they are provided to consumers. In the past, the quality of food products has suffered during these distribution and storage steps, so that by the time the food products reached consumers in a supermarket, the food products had degraded and were less appealing.

Efforts to maintain food product quality have focused on modifying or controlling the internal atmospheric environment within the packages containing the food products, while the packages and their food products are distributed and stored. (Oliveira, Abadias, Usall, Torres, Teixidó, & Viñas, 2015.) The atmospheric modification which takes place within packages may be dependent upon several variables such as permeability of the package material, respiration rate of the perishable product and temperature during distribution and storage. (Ben-Yehoshua, Beaudry, Fishman, Jayanty, & Mir, 2005; Mir & Beaudry, 2016.)

Current techniques which attempt to modify or control the atmosphere within the package(s) containing food products have been similar to those of controlled-atmosphere storage. These techniques allow respiration by the food product based on a limited transmission of gases between the interior atmosphere of the package and the external environment due to the permeability of the materials comprising the package.

However, the transmission of gases between the interior and exterior environments based only on material permeability may not provide sufficient respiration and optimal atmospheric conditions within the package for various food products. This may result in premature fermentation (degradation) of the food product during distribution and storage, which may result in decreased shelf-life, which ultimately lowers the quality of the food product when provided to the consumer in, for example, a supermarket. The end result has been decreased sales of such food products because of their lowered quality.

More recent packages have better controlled the internal atmosphere of the package during distribution and storage by including a number of microperforations in the package that provide an opening between the interior of the package and the external environment. These microperforations have allowed a more effective transmission of gases between the interior and exterior of the package, thereby allowing a more effective rate of respiration by the food products.

While these types of packages have increased the quality of the food product when it is ultimately made available to consumers, these types of packages may still face issues during later microwave steam cooking. That is, the size of microperforations that provide effective respiration during distribution and storage are generally small. Though the desired size (e.g., diameter) of respiration microperforations may vary for different types of food products, larger microperforations generally may not control the transmission of gases to provide effective respiration rates.

However, the small microperforations that provide effective respiration may be too small to allow effective venting during a later microwave steam cooking operation. That is, the small respiration-oriented microperforations may not be large enough to allow sufficient steam and pressure to escape during a microwave steam cooking operation. In this situation, there is an increased risk that the package may burst open during cooking because excess pressure builds up within the package during cooking.

While the inclusion of larger microperforations in the package could avoid excess pressure from building within the package during cooking, such larger microperforations would detract from or eliminate the respiration that would otherwise be provided by smaller microperforations. As noted above, larger microperforations generally may not allow appropriate gas transmission rates to provide effective respiration. And a mix of smaller respiration-oriented microperforations and larger venting-oriented microperforations would still detract from or eliminate effective respiration, because the larger venting microperforations would simply trump any respiration function that would otherwise be provided by the smaller microperforations.

Accordingly, there is a need for a package that includes sufficiently small microperforations that allow appropriate gas transmission rates between the interior and exterior of the package to provide effective respiration to maintain food quality during distribution and storage, but yet allowing the cooking of the food in situ for safe, effective microwave steam cooking.

Some food products, especially packaged frozen food and refrigerated food products containing unsaturated oil or seasoning, are susceptible to oxidation. U.S. Pat. No. 9,016,944 discloses steam cooking packages, and various aspects of packaging that allows for the transmission of gases for respiration purposes, but the packages disclosed therein may not be suitable for storing food products that are high in moisture, fat or liquid foods. Therefore, there is a need to develop a non-breathable cooking package that has low oxygen transmission and devoid of open perforations prior to cooking, but yet allowing the cooking of the food in situ. For clarity, in situ cooking means cooking of food inside a sealed food package.

Accordingly, there is a need for a package and method of packaging fresh produce and other perishable foods, which allows the product to maintain excellent quality and shelf life during distribution and storage, but also allows the food product to be cooked safely and effectively in the microwave.

SUMMARY OF THE INVENTION

An aspect of the current invention regards establishing and/or maintaining a desired internal atmosphere in a package containing a food product, to help preserve the food product's quality after it is packaged to the time when it is ultimately made available to consumers, such as at a supermarket, and/or when the food is cooked by the consumer. To this end, the current invention preferably maintains a desired internal atmosphere within the package during distribution and/or storage of the food product. For example, the package may contain different types of openings, such as microperforations, that allow a desired rate of transmission of gases between the internal atmosphere of the package and the exterior environment. In this manner, the internal atmosphere of the package allows the packaged food to display a desired rate of respiration which improves quality.

Another aspect of the current invention regards the steam cooking, such as microwave steam cooking, of the food product contained in the package described above. To this end, it is preferred that the package of the current invention include a venting system that will allow sufficient steam and pressure to escape from the package during a microwave cooking operation. A venting system in the package of the current invention is preferred because the openings in the package, such as microperforations, may be sized small enough to allow desired levels of gas transmission and respiration of the food product to occur. As such, the openings may be too small to release sufficient steam and pressure during a cooking operation. Conversely, including larger openings in the package to sufficiently release steam and pressure would reduce or eliminate the respiration feature provided by the smaller openings. Accordingly, this aspect of the current invention regards a venting system that is generally visually closed during distribution and storage so that effective respiration may occur during that time; but then opens due to the internal pressure that builds during a microwave or other steam cooking operation. As such, this aspect of the current invention generally involves a respiration system and a venting system, wherein the venting system is initially visually closed during distribution and storage, but that later opens during a steam cooking operation to release excess pressure.

In an aspect of this type of package, the venting system may comprise visually closed valves, such as precision cuts, formed in at least some of the thickness of the film comprising the package. The precision cuts in the film serve to weaken the package at locations where the cuts are located. The depth, length, number and location of the precision cuts may affect when the visually closed valves open during a steam cooking operation. That is, for example, a package having visually closed valves (precision cuts) that are deeper, longer or more numerous may open more quickly and/or under less internal pressure. As such, the visually closed valve characteristics may be configured to open at a certain time and/or pressure, which may vary according to the food product contained within the package, location of the precision cuts, depth of the precision cut, cook time, microwave wattage and/or the type of package.

In another aspect of the invention, when the visually closed valves open, they will have an open area through which internal pressure is released. It is preferred that the material(s) comprising the film of the package allow the visually closed valves to open a desired amount so that the amount of released pressure, steam or heat may be regulated to provide desired cooking conditions. That is, it is preferred that excess pressure is released to avoid the package from bursting, but it is also preferred that a desired amount of pressure, heat and steam is retained within the package so that the food products' nutrients and natural juices are retained, and so that the food product is cooked evenly and at the desired temperature.

In another aspect of the invention, the microperforations of the respiration system and the visually closed valves of the venting system are configured to accommodate the respiration and cooking parameters of the particular food product contained in the package. An alternative aspect of the invention regards foods that exhibit low rates of respiration. With such foods, the permeability or breathability of the film structure itself may provide inherent gas transmission properties that sufficiently reduce respiration such that microperforations are unnecessary. In this alternative, the respiration system may comprise the inherent gas transmission properties of the film structure itself, while the venting system may comprise visually closed valves that are configured to accommodate the cooking parameters of such low-respiration foods.

Other aspects and benefits of the invention are described herein. It is to be understood that both the foregoing general description and the following detailed description are exemplary and explanatory only, and are not restrictive of the current invention.

DETAILED DESCRIPTION OF THE PREFERRED EMBODIMENTS

Figure 1A:
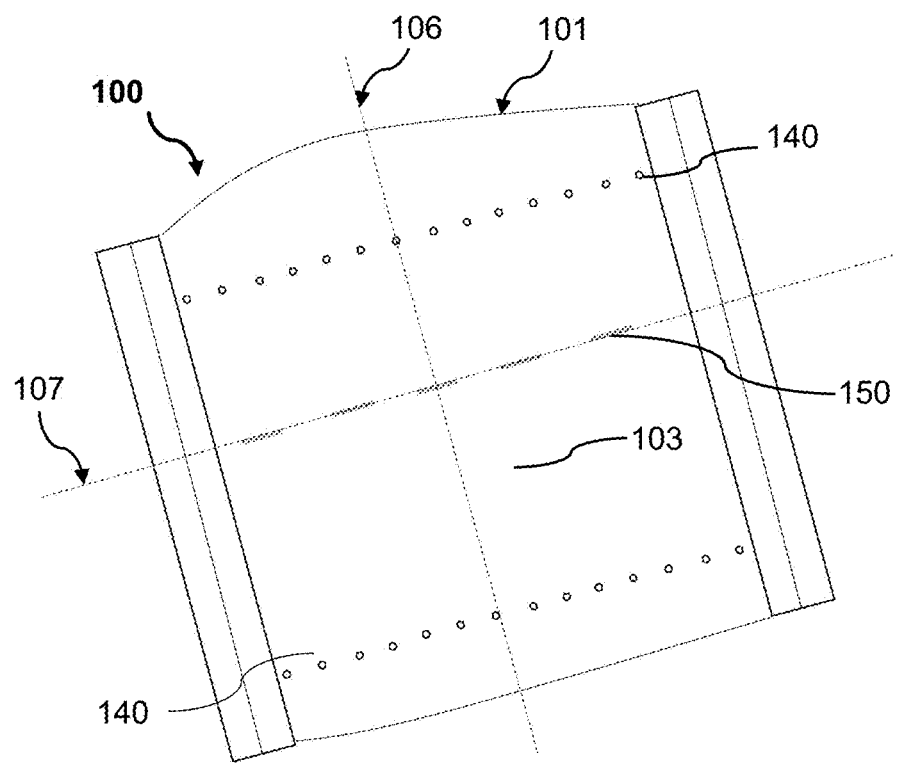
FIG. 1A is a top view of food packaging.

The current invention is now described with reference to the figures, where similar components may be denoted by the same or similar reference numerals.

Overview

In general, the packaging system (PS) of the current invention comprises a package for containing a food product or food products. The package may include a breathable or non-breathable, microwavable film, such as a composite film structure with multiple layers or components. Alternatively, the film may comprise a single layer. The PS may be formed as a bag or pouch that is formed entirely, mostly or at least partially from the film. For example, the PS of the current invention may be a bag formed by a vertical fill form seal machine.

Alternatively, the PS may comprise include a tray, bowl or other shaped container that may comprise hard plastic or some other material, and that is sealed with the film mentioned above. For example, the PS may comprise a hard plastic tray or bowl that is sealed by a lid of the composite film.

In preferred embodiments hereof, the PS of the current invention may include components or mechanisms within and/or incorporated into the film structure that are configured to perform different functions. For example, the PS may include one or more of the following components or mechanisms:

1. Atmospheric control attributes (ACA), such as microperforations, that may control and/or maintain various atmospheric storage conditions within the package as required by certain types of perishable and/or respiring food products contained therein to maintain their quality and increase shelf life during distribution and/or storage, i.e., up until the time the food product is made available to and/or cooked by the consumer;

2. Pressure activated steam venting mechanisms, such as precision cuts or visually closed valves as described herein, that may be activated or opened by the buildup of pressure during a microwave cooking process; and that, when activated or opened, may control or regulate the pressure and heat that is released from the PS and that remains within the PS to cook the food therein at a desired pressure and heat; and 3. Other components, mechanisms and structure that are required or desirable to provide structure and fulfill other functions of the PS.

By including the above-referenced components or mechanisms, the PS of the current invention may contain a perishable food product, such as fruits and vegetables, and may assist in optimizing quality and shelf-life of the perishable food product. The PS may also be used for storing and distributing perishable meat products. The PS may accomplish this optimization with the respiration system that provides a desired interior atmosphere (where the perishable food product is located) for the storage and distribution of the perishable food product. The PS of the current invention may contain perishable food products that are frozen and/or non-frozen. Further, the venting system of the PS allows the cooking of the perishable food product while contained within. For example, the packaging device including the perishable food product within may be positioned for steam cooking within a microwave oven. Other cooking techniques as contemplated by those of ordinary skill in the art may be employed for cooking the perishable food product within the packaging device of the present invention.

As is known, perishable foods such as fruits, vegetables, meats and other types of food products may have a relatively short shelf life under normal environmental and atmospheric conditions. However, by modifying the composition of the internal atmosphere within the PS, the shelf life of these foods may be extended and their quality maintained to the time when such food products are made available to and/or cooked by the consumer.

Atmospheric control attributes (ACA), such as microperforations in the film structure of the PS, may allow the transmission of gases from the package interior through the microperforations to the outside environment. In this way, the levels of specific gases and the relative humidity within the PS may be modified and/or controlled to allow appropriate respiration and to thereby maintain food quality.

For some food products, such as cut romaine lettuce, etc., that exhibit low rates of respiration, such as when contained in packages held at, for example, 5° C., ACAs such as microperforations in the film structure may not be required to modify package atmospheres within the PS of the current invention to improve shelf life and food quality during storage and distribution, or before cooking. For such food products, the inherent gas transmission properties of the film structure itself provide a permeability or breathability that sufficiently helps to reduce the respiration of the food prior to the microwave cooking operation. For such food products exhibiting low rates of respiration, it is preferred that film structures providing a rate of transmission of oxygen of 1 to about 850 cubic centimeters per 100 square inches per day, and more preferably, about 20 to about 850 cubic centimeters per 100 square inches per day, are used for the PS of the current invention.

In general, discussion of reducing the respiration of the food product herein means the development of a resultant package $O_2$ content that is sufficiently low when respiring fruits and vegetables are packaged within the PS of the current invention during at least a portion of storage, distribution and/or marketing, i.e., before a cooking operation. In a preferred embodiment, for example, respiration of the food product involves developing an internal atmosphere of the PS having an $O_2$ content that is 20.5% or lower for respiring fruits and vegetables.

For example, reducing the amount of $O_2$ while increasing the amount of $CO_2$ within the PS may reduce the respiration rate of many respiring fruits and vegetables, thus maintaining their quality for a longer time during distribution and storage, and improving their shelf lives when made available to the consumer. This may be accomplished by designing the microperforations to have a certain diameter range, to be formed of a certain shape or size, to include a specific number of microperforations in the PS, to include the microperforations at specific locations in the PS, and to consider other microperforation properties or characteristics.

In preferred embodiments, the attributes of the microperforations of the PS may be chosen to achieve target atmospheres of $O_2$, $CO_2$, $C_2H_4$, water vapor and other gases of the interior atmosphere of the PS, e.g., for the particular food contained therein. In this way, the PS of the current invention may optimize the shelf life and quality of the perishable food products that may be stored within the PS. The attributes of the microperforations of the PS that may affect the internal atmosphere of the PS are described later in this application. Additionally, the use of microperforations and other aspects of modified atmosphere packaging (MAP) are described in U.S. Pat. No. 9,016,944, the disclosure of which is incorporated by reference, as if fully set forth herein.

Oftentimes, the size of microperforations used to provide a respiration function may be relatively small so as to control the transmission of gases. In other words, large microperforations may not sufficiently control such transmission.

However, such relatively small, respiration-oriented microperforations may not be suitable for when the PS is placed in a microwave and undergoes a cooking operation. To this end, when typical food packages undergo a microwave cooking operation, pressure, heat and steam typically build within the packaging. If not properly regulated, excess pressure may cause the package to burst, thereby creating a safety hazard as well as a mess.

To control this pressure and regulate its release, microwavable steam cooking packages typically include steam vents, such as microperforations, in the film comprising the package. Such microperforations are typically large enough to allow excess pressure to escape from the packaging to avoid bursting of the package. Such steam venting microperforations may still be small enough so that a desired amount of pressure, heat and steam remain inside the package to properly and evenly cook the food and to retain the food's nutrients and natural juices. But in any event, such steam cooking microperforations may still be too large to control the transmission of gases for certain types of fresh foods, and thus do not provide a respiration function.

As stated above, the smaller size of the respiration-oriented microperforations may be specifically chosen to allow for the precise transmission rates of the gases through the packaging, but may not provide an adequate venting function. However, simply adding larger microperforations to provide a venting function during microwave steam cooking would reduce or eliminate the respiration feature provided by the smaller microperforations.

The PS of the current invention addresses the foregoing issue by including (i) a respiration system with microperforations or other ACAs that are sufficiently small to effectively control the transmission of gases to provide a respiration function during distribution and storage, as well as (ii) a venting system, that remains inactive or visually closed during distribution or storage, but that becomes active or opens during steam cooking in order to effectively regulate the release of excess pressure to avoid bursting, but to also retain desired pressure, heat and steam so that the food retains its nutrients and natural juices. In an alternate embodiment involving low-respiration rate food products, (i) the respiration system of the PS may be represented by the permeability or breathability of the film structure due to its inherent gas transmission properties. In this alternate embodiment, ACAs such as microperforations may be unnecessary. Alternatively, the respiration system of the PS may provide respiration based on both the permeability of the film structure and the ACAs. In this alternative, the transmission of oxygen provided by diffusion through the ACAs may account for much or most of the overall oxygen transport. However, the number of ACAs and/or their cumulative open area may be reduced given the gas transmission provided by the permeability of the film structure itself. Also in this alternate embodiment, (ii) the venting system may include suitable inactive or visually or effectively closed valves that open during steam cooking.

The Packaging System

The current invention regards a packaging system (PS) that may be used for both (i) storage of perishable and/or respiring food products (both frozen and/or non-frozen) during distribution and storage and (ii) microwave steam cooking of such food products. This may be provided by the pressure-activated steam venting mechanisms (also referred to as the visually closed valves), that remain visually closed during distribution and storage, as described herein. As such, the PS may extend the shelf life of the food products because only the ACAs are preferably open and/or active during distribution and storage. However, the ACAs that provide respiration may also help regulate the heat and/or pressure inside the packaging system (PS) during microwave cooking when the steam venting components open or otherwise become active.

The ACAs and the steam venting components may be separate and distinct from one another, and/or the ACAs and the steam venting components may be combined and/or overlapping. This will be described in detail in other sections. Preferred embodiments of the current invention are now described with reference to FIGS. 1A and 1B.

As shown, the packaging system (PS) 100 may comprise a breathable, microwavable composite film structure, or base film, 101 in the form of a bag or other type of package or container. The bag may include a sealable enclosure 103 in which various food products may be contained. As described herein, these food products may include various perishable food products that may respire and/or require internal atmospheric modification within the enclosure 103 of the PS 100. The PS 100 may also be utilized with other types of food products and/or other products in general that may benefit from the PS 100.

The film structure 101 may be formed from one or a combination of polymer groups such as polyalkenes (e.g., polyethylene—low density, low linear density, high density, etc.), polypropelenes, polystyrenes, polyvinyls (e.g., polyvinyl chloride), polysiloxanes (e.g., silicone rubber), polydiens (e.g., natural rubber) and other types of polymers or materials. It is preferred that the materials selected may expand during a microwave steam cooking operation.

The base film 101 may be extruded from a single polymer or from blends of various polymers where each polymer may perform a specific function, such as contributing strength, transparency, sealability, or machinability, to meet specific product requirements. Similarly, the material(s) of the base film 101 may be processed using various technologies and treatment applications, such as lamination, co-extrusion, monolayer, or a plurality of co-extruded layers to provide the packaging device PS 100 with specific properties and for achieving particular configurations.

In any event, it is preferred that when the visually closed valves, 150 formed in the film 101 open during steam cooking, the material comprising the film 101 allows the valves to open only a desired amount. In other words, it is preferred that the film material is sufficiently strong so that a large tear in the film does not occur when the valve opens.

In this manner, the size of the opening(s) of the activated, open valves allows desired amounts of pressure to be released, and also provides that sufficient pressure and steam are retained in the PS 100. As such, the release of excess pressure avoids bursting of the package, and the retention of desired pressure and steam preferably results in the food being evenly cooked at a desired temperature and retaining nutrients and juices.

Figure 1B:
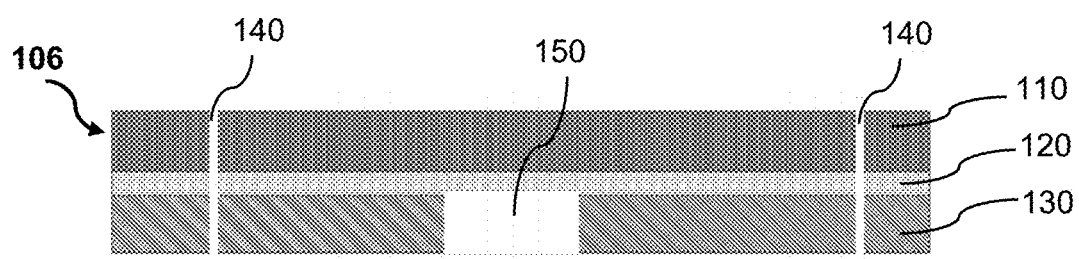
FIG. 1B is a side section view of food packaging.
Figure 1C:
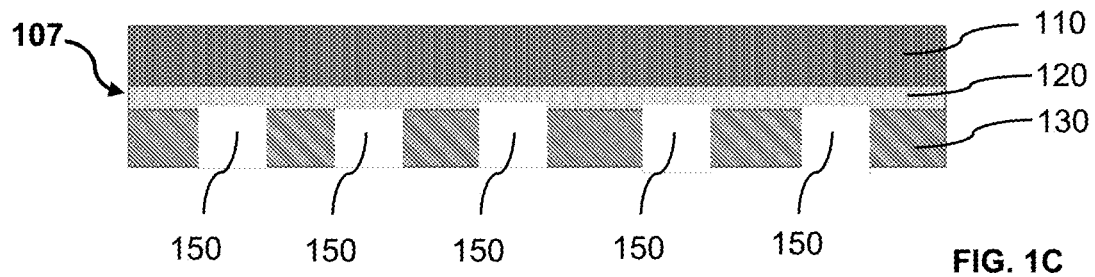
FIG. 1C is a side section view of food packaging.
Figure 1D:
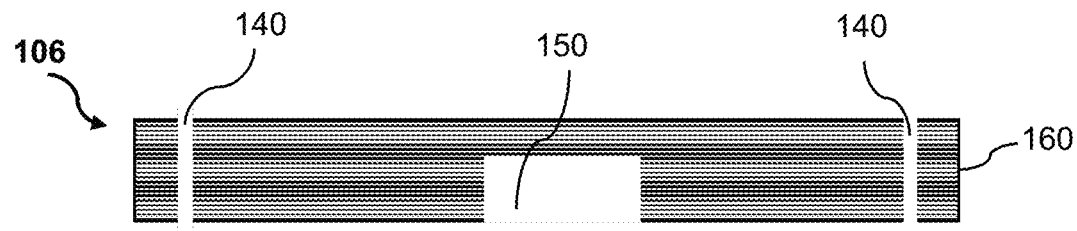
FIG. 1D is a side section view of food packaging.
Figure 1E:
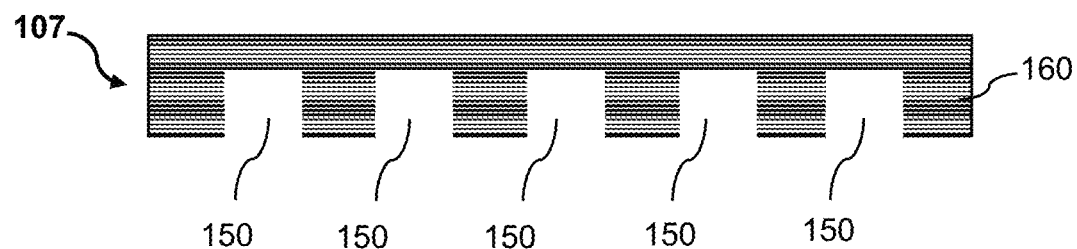
FIG. 1E is a side section view of food packaging.

In a preferred embodiment as shown in FIGS. 1B and 1C the PS 100 may comprise multiple layers. For example, the base film 101 may comprise three layers, but it should be noted that the base film 101 of other types of PS 100 may include other numbers of layers, or may comprise a single layer as shown in FIGS. 1D and 1E. Though the single layer 160 of FIGS. 1D and 1E shows varying amounts of shading, which may represent the use of different materials, these figures are still intended to show a single layer of film structure. As such, the scope of the current invention is not limited to the three-layer embodiment shown in FIGS. 1B and 1C.

FIG. 1B shows the base film 101 of PS 100 from the perspective along cut-line 106 of FIG. 1A, while FIG. 1C shows the same base film 101 from the perspective along cut-line 107 of FIG. 1A. As shown, the three-layered composite structure may include an innermost sealant layer 130 that may be heat sealable and in direct contact or in proximity with the food product. The middle layer 120 may include an adhesive layer or a laminate layer that may connect and secure the sealant layer 130 with the outermost layer 110. The outermost layer 110 may be a printable layer that may include an external surface and/or layer that may be printed.

In a preferred embodiment as shown in FIGS. 1D and 1E, the PS 100 may comprise monolayer plastic structures. For example, the base film 101 may comprise of single layer 160, wherein the film may be produced using different materials in a polymer family that share a common recycling code. For instance, low density, linear low density or high density polyethylene have a recycling code of 1. Therefore, the film 160 extruded from any of the resin grades from the polyethylene resin family, irrespective of the manufacturing process used, are referenced herein as film comprising monolayer plastics. Similarly, monolayer films may be formed from other resin families such as polypropylene, polyester, etc. In any event, the monolayer film 160 of the current invention generally refers to materials extruded or laminated from a family of polymers that have a common recycling code.

FIG. 1D shows the base film 101 as a monolayer structure 160 of PS 100 from the perspective along cut-line 106 of FIG. 1A, while FIG. 1E shows the same base film 101 from the perspective along cut-line 107 of FIG. 1A. As shown, the single-layered structure 160 may be heat sealable and in direct contact or in proximity with the food product. Also wherever needed, the layer 160 may be surface printed or laminated to another printable layer, that is reverse printed.

In a preferred embodiment, the monolayer film 160 may be constructed with a material height or thickness of 1 to 3.0 mil. Other heights or thicknesses may also be used. For example, the monolayer 160 of exemplary PS 100 embodiment may preferably have and/or be formed with a material thickness ranging from 0.5 to 5.0 mil, and more preferably from 0.5 to 3.0 mil. Other thicknesses are within the scope of the current invention.

As shown in FIGS. 1B and 1D, the PS 100 may include one or more atmospheric control attributes (ACA) 140 that may be configured as microperforations 140. The microperforations 140 may extend through all the layers of the PS 100 (e.g., from outside the PS 100 to inside the enclosure 103). These ACAs may thus be open from the time the food is packaged through when the food is cooked. As such, the ACAs 140 are preferably open during any distribution or storage of the food product.

In this manner, the ACAs 140 preferably connect the interior of enclosure 103 (and thus the respiring and/or perishable food product(s) therein) to the external environment outside the PS 100, so as to permit the transmission of gases and to provide a respiration function. As such, the ACAs 140 may form a respiration system.

The microperforations 140 of the respiration system are preferably configured and/or designed to help promote the optimization of various internal atmospheric conditions, including one or a combination of $O_2$, $CO_2$, $C_2H_4$ and $H_2O$ vapor concentrations, in the enclosure 103 within which the respiring perishable food product(s) may be located. The characteristics of such ACAs 140 and of the respiration system are described in more detail later.

The PS 100 may also include one or more precision cuts (PC) 150 that may be configured in one or more layers of the PS 100, and that may act as pressure-activated steam venting mechanisms (also referred to as the visually closed valves). As described in more detail below, the PCs 150 represent a weakened area in the base film 101 of the PS 100. The discussion of "visually closed" herein generally means that the PCs 150 appear closed to the naked eye, e.g., the operation of forming the PCs 150, such as forming PCs with a laser, does not result in the PCs 150 extending all the way through the film structure 101 so as to be visibly open to the naked eye. It should be noted that a PC 150 that appears closed to the naked eye, may appear open if viewed under a microscope or other magnification, for example, due to manufacturing tolerances of how deep a laser cuts into the film structure 101. However, it is believed that any such "opening" that may be seen under a microscope would not materially alter the respiration properties of the respiration system prior to cooking and are thus effectively closed; while PCs 150 that appear open to the naked eye prior to cooking could detract from the respiration properties. As such, in a preferred embodiment, the PCs 150 generally appear closed to the naked eye. However, the scope of the current invention also includes PCs 150 that may appear open under magnification, but that are effectively closed because they do not materially alter the respiration properties of the ACAs 140 of the respiration system because the size of their openings as viewed under magnification is/are sufficiently small. The PS 100 may open up, e.g., the base film 101 may split open or otherwise fail at the locations of the PCs 150, when sufficient pressure has built up within the enclosure 103 during a microwave cooking operation. As such, the PCs 150 form a venting system.

The PCs 150 may be cuts that pass through most of or all of one or more layers of the base film 101 of the PS 100. In a preferred embodiment, one or more PCs 150 may be configured in the innermost layer 130 (that is, the cuts 150 may pass through the innermost layer 130). It is preferred that the PCs 150 are precisely cut or otherwise precisely imparted to the base film 101, so that, for example, the PCs 150 may be restricted to a single layer (that is, the cuts 150 may pass through only a single layer) of the multi-layer embodiment shown in FIGS. 1B and 1C, e.g., where the PCs 150 extend only through the innermost layer 130. Alternatively, the PCs 150 may be partially cut through the single layer 160 as shown in the mono-layer embodiment of FIGS. 1D and 1E, where the PCs 150 extends only through a partial thickness of layer 160.

Precision cutting may be accomplished by a laser, though other cutting means may be used. Precision cutting is preferred because the depth of the cuts will generally impart a certain relative weakness to the regions of the base film 101 where the PCs 150 are located. In other words, deeper PCs 150 may open during steam cooking at a lower pressure than would shallower PCs 150.

As such, the depth of the PCs 150 may be chosen so as to dictate (i) the amount of pressure, steam and heat it takes to open the valves, (ii) the time required to open the valves and (iii) how much pressure, steam and heat the now-active or open valves of the venting system will release. The desired "opening pressure" or "failure pressure" or "activation pressure," and the desired "opening time" or "opening duration," and the desired "amount of pressure release" may vary for different types and quantities of food products according to the desired pressure, heat and steam at which the food products should be cooked. The opening, failure or activation pressure, the opening or duration time, and the amount of pressure release, may also vary depending on how much of the food products nutrients and juices are desired to be retained in the PS 100 during cooking.

In the embodiment shown in FIG. 1A, the PCs 150 may be distributed on the PS 100 along one or more lines (e.g., along line 107). The distribution of the PCs 150 may be sequential, intermittent, continuous, patterned, in any location and/or orientation and any combination thereof. The number and distribution of the PCs 150 on the PS 100 may depend on various factors including, the external environment, the bag type, the package size and weight, and the moisture content and type of the food product that may be located inside the PS 100. The number and distribution of PCs 150 may also depend on the type of food being cooked and the desired venting strategy, i.e., choosing the appropriate opening pressure, opening time and amount of pressure release to suit particular food products.

Because the PCs 150 may be restricted to a single layer within the PS 100 (e.g., the innermost layer), the PCs 150 in their initial and un-activated state preferably do not connect the internal atmosphere within the enclosure 103 to the external environment. As such, the respiration feature provided by ACAs 140 is maintained.

However, because the PCs 150 may cut through most of or the entire innermost layer 130, the PCs 150 may weaken the overall layered structure of the PS 100 in the areas of the PCs 150 and open up to serve as a venting system during steam cooking.

During the use of the PS 100 for microwave cooking applications (that is, when the PS 100 and its food within are being cooked within a microwave oven), pressure may build within the enclosure 103 causing the enclosure 103 and the PS 100 to expand. This buildup of pressure within the enclosure 103 may facilitate the pressure cooking of the food within, e.g., by promoting uniform cooking, the retention of nutrients and juices, etc.

The characteristics of PCs 150 and how they may affect steam cooking properties is now further described. In a preferred embodiment, characteristics of the PCs 150 (e.g., their depths, widths, lengths, shapes and other characteristics) may be designed to facilitate the failure (e.g., the splitting of) the middle and outermost layers 120, 110 or failure through a single layer 160 when a particular pressure or range of pressures may build within the enclosure 103 during a cooking process. That is, as the pressure may build within the enclosure 103 and the PS 100 may expand, the pressure may become sufficiently high so that it splits the PS 100 open in the weakened areas of the PCs 150. This may include the tearing and/or splitting of the middle and outermost layers 120, 110 or failure through a single layer 160 in the weakened areas surrounding the PCs 150. When this occurs, the PCs 150 may be visually open to the naked eye, though this may depend on the properties of the PCs 150 and/or the cooking parameters. In this way, the PCs 150 may act as safety valves that may be activated with increased pressure within the enclosure 103 during a cooking process. That is, the PCs 150 may allow the release of excess pressure to avoid the enclosure 103 from bursting.

In a preferred embodiment, the widths, lengths and/or shapes of the PCs 150 may be designed so that the PS 100 splits or otherwise opens in the areas of the PCs 150 when the internal pressure within the enclosure 103 may reach or exceed 0.3 psi. While this opening pressure may be suitable for certain foods, the PCs 150 of the current invention may be designed to facilitate the splitting or other opening of the PS 100 at any internal pressure within the enclosure 103 that may be appropriate for other food products. As such, the scope of the current invention is not limited to the above-referenced example of 0.3 psi.

Once the film 101 may split or otherwise open in the areas of the PCs 150, the film 101 may be open from the inner enclosure 103 to the environment outside the PS 100 in the areas of the PCs 150. These openings may then act as activated steam venting components by allowing steam and/or pressure to be released from inside the PS 100. The amount that the valves open may be controlled by the material comprising the film 101. It is preferred that the size of the openings is controlled so that a desired amount of pressure is released but also retained in the PS 100.

The sizes, shapes and other characteristics of the PCs 150 may be designed so that the resulting openings after the PCs 150 are activated may be sized to allow the desired amount of steam and/or pressure to be released from the PS 100. That is, the open steam release valves 150 may be large enough to avoid bursting of the PS 100, but not too large so that the internal enclosure 103 still retains the nutrients and juices of the food being cooked, and thus avoids releasing too much steam and/or pressure.

In this way, the activated PCs or opened steam release valves 150 function as a venting system and may regulate or otherwise control the pressure, steam and heat, and thus the cooking of the food inside the PS 100 as desired. But because the venting system was visually closed to the naked eye prior to cooking, or minimally open as viewed under magnification prior to cooking, the ACAs 140 of the respiration system were still able to provide the respiration feature.

The film structure 101 of the PS 100 may be formed as a pillow pack, a lap or fin seal bag, a bottom or side gusseted bag, a K-seal bag, any other type of bag or container and any combination thereof. As noted above, the base film 101 may also be formed as a lid or seal on a hard plastic or other type of container.

The PCs 150 in the film 101 of the PS 100 may be formed by a cutting process using any type of suitable technologies and/or techniques, such as laser drilling, mechanical cutting (e.g., mechanical die-cutting, rotary cutting, etc.), laser cutting, other types of cutting or forming methods and any combinations thereof. Alternatively, the PCs 150 may be formed in the film 101 as the film 101 is formed (e.g., during the film's extruding process) which may avoid the need for a separate tool or process to form the PCs 150. In this embodiment, the PCs 150 may comprise pre-formed channels, as opposed to cuts formed by a later cutting or forming process. In any event, the PCs 150 may be formed to any desired depth, shape, size, location, distribution, pattern and/or orientation as desired to facilitate cooking.

As noted above, it is preferred that PCs 150 are precisely formed by a laser, rotary die cut or mechanical punch. However, it should be noted that the scope of the invention is not limited to certain types of cutting or forming and the precision that may accompany them.

Figure 2:
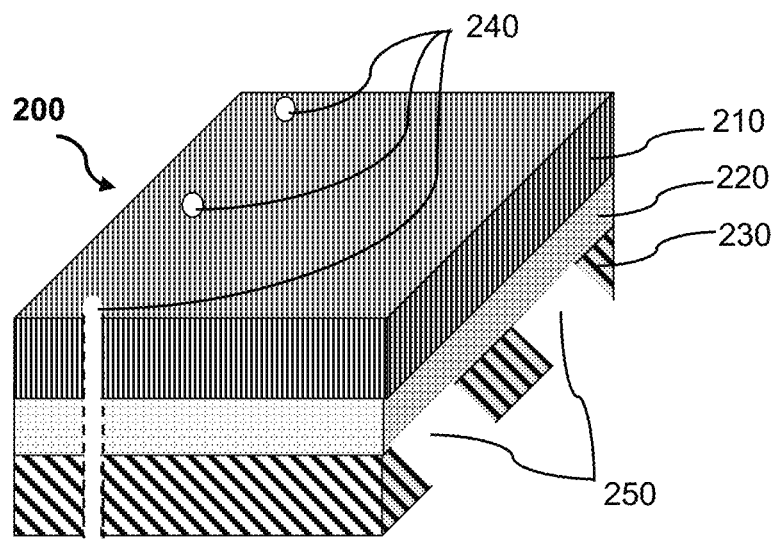
FIG. 2 is a perspective section view of food packaging.

Another preferred embodiment of the current invention is shown in the sectional view of FIG. 2. The PS 200 may include at least three layers 210, 220, 230, as well as ACAs or microperforations 240 that may pass through all three layers 210, 220, 230. In addition, the PS 200 may include PCs 250 that may pass through only the innermost layer 230. The microperforations 240 and the PCs 250 may be overlapping (i.e., the microperforations 240 may pass through the PS 200 in the same area as the PCs 250), or the microperforations 240 and the PCs 250 may be located in separate areas of the PS 200. In embodiments where the microperforations 240 are located within the PCs 250, the overlapping microperforations 240 and PCs 250 may further weaken the composite film 101 in these areas and/or may alter the pressure at which the PS 200 splits or otherwise opens. A further weakened film 101 may be suitable for cooking certain foods.

It is preferred that any overlap between the ACAs 240 and PCs 250 does not significantly detract from the respiration function provided by the ACAs 240 during distribution and cooking. That is, it is preferred that the overlap does not effectively render the ACAs 240 too large to control the transmission of gases and thus forfeit the respiration feature before cooking.

The microperforations 240 and/or the precision cuts 250 may be distributed continuously or intermittently throughout the PS 200, may be registered to certain sections of the PS 200 and/or may be configured in any combination thereof. The configuration, location, number, size, density, open area and other characteristics of the microperforations 240 and/or the PCs 250 located in an exemplary PS 200 may vary to accommodate different configurations of the PS 100 and/or different uses of the PS 100 with various food products without departing from the scope and spirit of the current invention. That is, the ACA/PC combination may be configured to provide respiration before cooking, while providing a desired opening pressure, a desired opening time and/or a desired amount of pressure release to provide the desired cooking properties.

In a preferred embodiment, the innermost sealant layer 230 may be constructed with a material height or thickness of 1.0 to 2.0 mil. Other heights or thicknesses may also be used. For example, the heat sealable layer 230 of any exemplary PS 200 embodiment may preferably have and/or be formed with a material thickness ranging from 0.5 to 5.0 mil, and more preferably from 0.5 to 2.5 mil. Other thicknesses are within the scope of the current invention.

In addition, it is also preferred that the sealant layer 230 have good heat sealability such that the material comprising layer 230 may be formed into bags or containers of any kind and/or sealed to other PS 200 embodiments such as trays or other types of containers. The middle layer 220 may be a lamination layer that may help bond the innermost sealant layer 230 to the outermost print layer 210. The laminate layer 220 may comprise an adhesive or other polymer that may help laminate, bond or otherwise join the inner and outer layers 230, 210 together.

The outer layer 210 (e.g., the print layer 210) may comprise a printable polymer layer, which may be clear and/or may have a matte finish. The print layer 210 of any exemplary PS 200 embodiment may have and/or be formed with a material thickness ranging from 0.20 to 5.0 mil, and preferably from 0.3 to 1.0 mil. However, other thicknesses may also be used.

The printing techniques to print upon the print layer 210 may include surface printing, reverse printing, other types of printing and any combination thereof. The printing may take place on either side of the layer 210, and more preferably, on the side of the layer 210 that faces away from the enclosure 103 or towards the outside environment. In this way the printing may be viewed by a user of the PS 200. Also, the printing may cover any amount of the surface area of the layer 210, ranging from small percentages (>0.1%) to the entire surface area of the layer 210. In addition, the surface layer 210 may include no printing whatsoever. It is preferred that the printing on the layer 210, if printing exists at all, has no or no material effect on the respiration, cooking and/or other capabilities and/or functionalities of the PS 100, 200 of the current invention.

Figure 3:
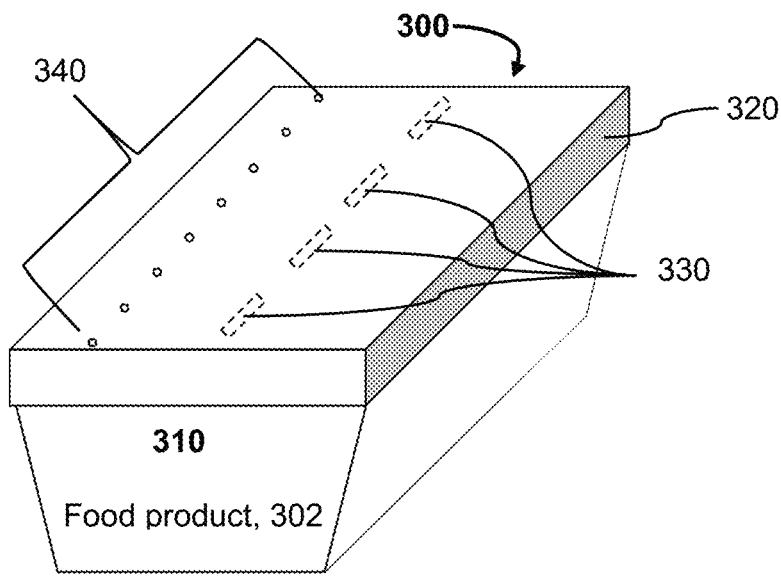
FIG. 3 is a perspective section view of food packaging.

In another preferred embodiment as shown in FIG. 3, the packaging system PS 300 may be configured as a sealable tray 310 or other type of sealable container that may be sealed with a breathable film 320. For example, the PS 300 may include a tray structure 310 with a top opening, and the top opening may be sealed and/or covered using the film 320. The tray 310 may include a polypropylene, PET (e.g., APET and/or CPET), any material (e.g., any polymer) that may be formed into a tray-like structure and any combination thereof.

The film 320 may include one layer 160 that may correspond to the mono-layer embodiment of FIGS. 1D and 1D, two layers, three layers or other numbers of layers. For example, the film 320 may comprise three layers that may correspond to the layers 110, 120, 130 of the embodiment of FIGS. 1A and 1B, and/or three layers that may correspond to the layers 210, 220, 230 of the embodiment of FIG. 2. In this example, the innermost layer (e.g., layer 130 and/or 230) may be a sealable layer that may be sealed directly to the top of the tray 310. The sealable layer may be removably sealed to the top of the tray 310 so that it may be peeled off.

Alternatively, the film 320 may be fitted to tray 310 so as to seal tray 310 in such a way so that only the inner area of the layer 320 is a peelable layer or weld sealed to the tray 310. In another example, the film 320 may be a single layer structure, wherein the layer may be a heat sealable layer similar to layer 160 of FIGS. 1D and 1E. In another example, the film 320 may be a two layered co-extruded structure or the like. Other numbers of layers may also be used.

The film 320 may include one or more ACAs or microperforations 340, that may pass through the film 320 (e.g., through all layers of the film 320) thereby connecting the interior of the enclosure of the tray 310 (and thereby any respiring and/or perishable food product 302 within the enclosure) to the external environment outside the PS 300. The microperforations 340 are preferably configured to promote the optimization of various internal atmospheric conditions, including one or any combination of $O_2$, $CO_2$, $C_2H_4$ and $H_2O$ vapor concentrations (and/or any other types of applicable elements or compounds), within the enclosure where the respiring perishable food product 302 may be located.

The PS 300 may also include one or more precision cuts (PC) 330 that may be configured in the sealable film 320. Depending on how many layers the film 320 may include, the PCs 330 may be cuts or other weakened areas that may pass through most of or all of one or more layers of the film 320. In a preferred embodiment hereof, where the film 320 includes two or three layers (e.g., layers corresponding to layers 110, 120, 130 of FIGS. 1B and 1C), the one or more PCs 330 may extend through the innermost layer 130. In FIG. 3, PCs 330 are shown as dashed lines to denote that the PCs 330 are formed on the interior side of the film 320. It is preferred that the PCs 330 are formed with some precision so that the PCs 330 may be restricted to a single layer (i.e., similar to how the cuts 150 may pass through only a single layer), and in this embodiment, to only the innermost layer 130.

In another preferred embodiment, where the film 320 includes a single layer (e.g., layers corresponding to layers 160 of FIGS. 1D and 1E), the PCs 330 may extend into the single layer a particular or desired amount (e.g., a predefined cut depth), and the PCs 330 do not extend all the way through the single layer. In this way, the single layer may be weakened in the areas of the PCs 330 but may remain initially intact.

In the embodiment shown in FIG. 3, the PCs 330 may be distributed on the film 320 along one or more lines. The distribution of the PCs 330 may be sequential, intermittent, continuous, patterned, in any location and/or orientation on the film 320 and any combination thereof. The numbers and distributions of the PCs 330 on the PS 300 may depend on factors including, without limitation, the external environment, the bag type, the package size and weight and the moisture content of the food product that may be located inside the PS 300. The configurations and the different characteristics of the PCs 330, such as those described above in connection with the PCs of the other embodiments, may also be varied. Also as discussed above in connection with the other embodiments, the PCs 330 may be configured to provide the desired opening pressure, the desired opening time and/or the desired amount of pressure release (i.e., the desired size of the opened valves).

Figure 4A:
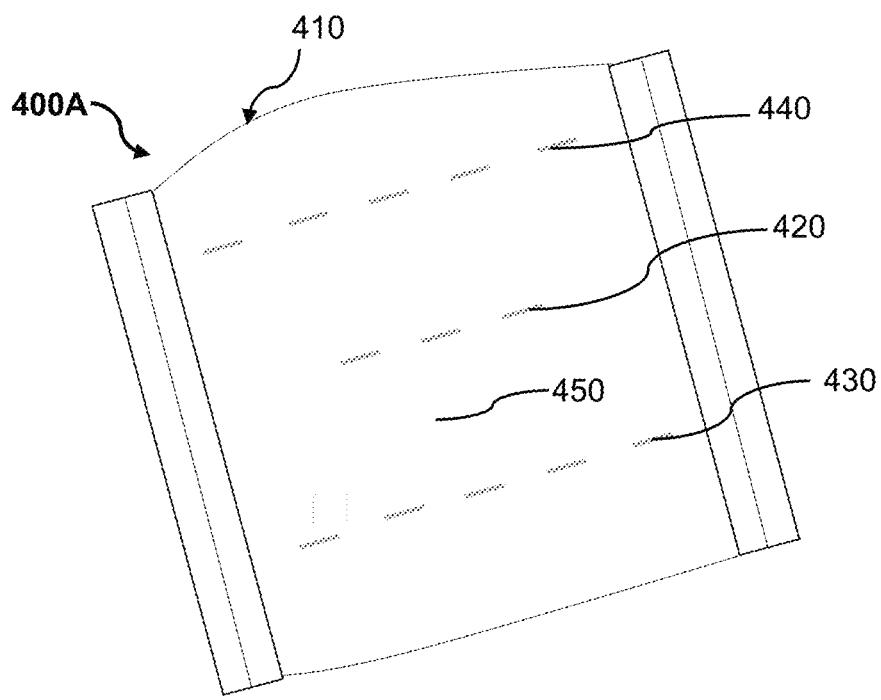
FIG. 4A is a top view of food packaging.
Figure 4B:
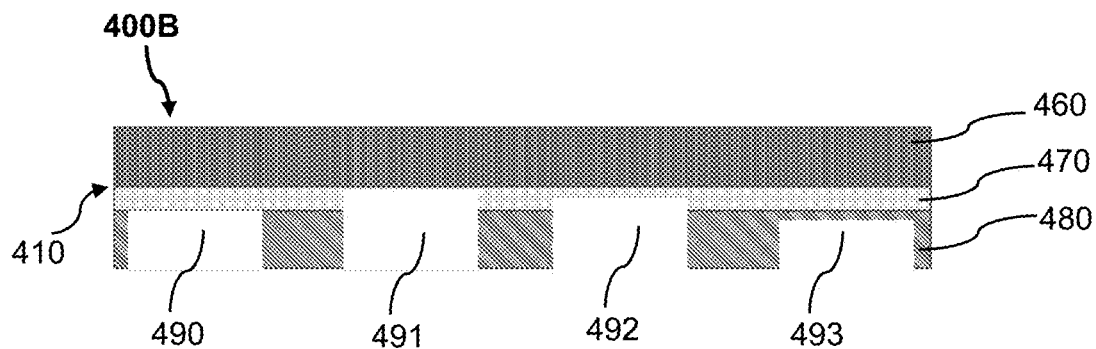
FIG. 4B is a side section view of food packaging.

In another preferred embodiment of the current invention as shown in FIGS. 4A and 4B, the packaging system (PS) 400A may include a non-breathable, microwavable composite film structure 410 in the form of a bag or other type of container that may be configured to contain and safely store frozen, shelf-stable and/or vacuum-requiring food products within its enclosure 450. The PS 400A may further include precision cuts (PC) 420, 430, 440 that may be formed in the top portion of the PS 400A (as shown by PC 440), in the middle portion of the PS 400A (as shown by PC 420), in the bottom portion of the PS 400A (as shown by PC 430) or in any other location on the PS 400A and any combination thereof.

As shown in FIG. 4B, the composite film structure 410 may include three layers 460, 470, 480 that may correspond to the three layers 110, 120, 130 of the embodiment of FIGS. 1A, 1B and 1C and/or to the three layers 210, 220, 230 of the embodiment of FIG. 2. As also shown in FIG. 4B, film structure 410 may also include PCs 490, 491, 492, 493.

In a preferred embodiment hereof, the PC 490 may pass through only the innermost sealant layer 480 as shown. In another exemplary embodiment hereof, the PC 491 may pass through the entirety of both the innermost sealant layer 480 and the middle laminate layer 470 as shown. In another exemplary embodiment hereof, the PC 492 may pass through the entirety of the innermost sealant layer 480 and through only a portion of the middle laminate layer 470 as shown. In another exemplary embodiment hereof, the PC 493 may extend through only a portion of the innermost sealant layer 480 (e.g., a predefined cut depth into the sealant layer 480).

One or more of the varying depths of the PCs may be included in one PS 400A to provide a desired opening pressure, opening time and/or amount of pressure release. That is, the combinations of the different depths of the PCs will determine the relative weakening of the PS 400A, which in turn will dictate the opening pressure and opening time.

The PCs 420, 430, 440 of FIG. 4A may correspond to any, all or none of the PCs 490, 491, 492, 493 and/or any combination thereof. The composite film structure 410 may include only a single layer (in which PC 493 may apply), a total of two layers (in which PCs 490, 492, and/or 493 may apply) and/or any other numbers of layers and any combinations thereof. As noted above, these combinations allow the opening pressure, opening time and amount of pressure release to be chosen so that the food is cooked with the desired pressure, steam and heat.

The PCs 420, 430, 440, 490, 491, 492, 493 may generally weaken the film structure 410 in the areas of these PCs, and any and/or all of the details described in other embodiments herein regarding other PCs (e.g., PCs 150, 250, 330) and their characteristics and/or functionalities with respect to other PSs (e.g., PSs 100, 200, 300) respectively, may also apply to PCs 420, 430, 440, 490, 491, 492, 493 and PS 400A. In this way, the PCs 420, 430, 440, 490, 491, 492, 493 may be pressure-activated during the microwave cooking process in order to control or regulate the pressure and heat within the PS 400A during cooking, and may act as safety valves. The configurations, locations and other characteristics of these PCs may be as described above in connection with the other embodiments.

While FIGS. 4A and 4B do not depict the PS 400A as including ACAs (e.g., microperforations), the PS 400A may also include ACAs (e.g., microperforations) that may be distinct from the PCs 420, 430, 440, 490, 491, 492, 493, that may overlap the PCs 420, 430, 440, 490, 491, 492, 493 and/or that may be configured in any combination thereof. Any ACAs in the PS 400A may include all or some of the characteristics and aspects as described in relation to other ACAs in any or all of the other embodiments herein.

Figure 5:
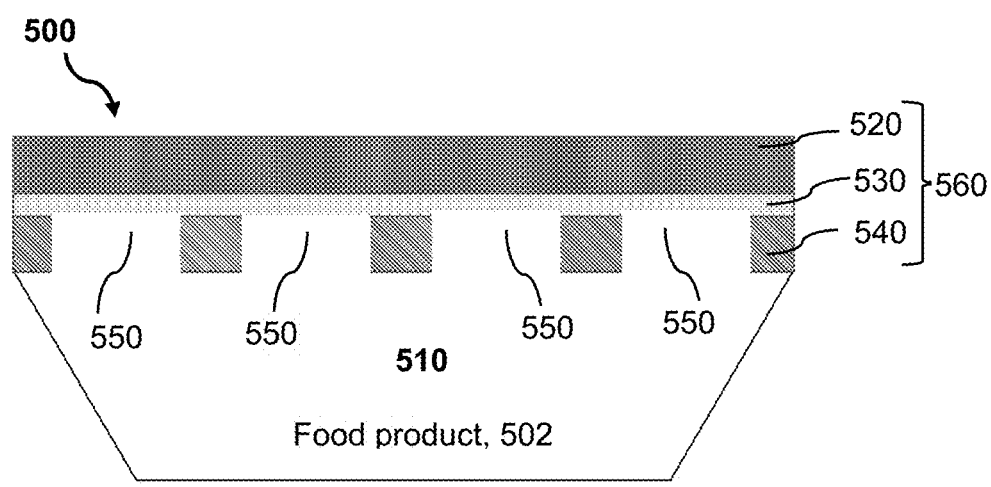
FIG. 5 is a side section view of food packaging.

In another preferred embodiment of the current invention as shown in FIG. 5, a PS 500 may include a non-breathable, microwavable food packaging system that may include a sealable tray 510 or other type of container. The tray 510 may be sealed using a sealable multilayered film structure 560 that may include PCs 550. Food products 502, e.g., frozen, shelf-stable and/or food products 502 that may require vacuum, may be placed within the sealed tray 510 for safe storage.

The tray 510 may comprise polypropylene, PET (e.g., APET or CPET), any material (e.g., polymer) that may be formed into a tray-like structure or other form and any combination thereof. In one example, the peelable film structure 560 that may be used to seal the tray 510 may include a three-layered structure comprising an innermost layer 540, a middle lamination layer 530 and an outer, printable layer 520. The middle lamination layer 530 may attach and secure the innermost layer 540 to the outer, printable layer 520.

The innermost layer 540 may be sealed to the top of the tray 510 in a way that it may be peeled off or weld sealed onto the tray 510 containing food product 502. The innermost layer 540 may also be weld-sealed to the tray 510 or sealed to the tray 510 using other sealing methods.

In an alternate embodiment, the film structure 560 may be a single layered structure (e.g., layers corresponding to layer 160 of FIGS. 1D and 1E), and the single layer may comprise a layer that may correspond to the innermost sealable layer 540 as described above. The film structure 560 may also include a two-layered co-extruded structure, any other type of suitable structures and any combination thereof.

The film structure 560 may also include one or more PCs 550 as shown that may correspond to one or more PCs in the embodiments of FIGS. 1A-1E, 2, 3, 4A and/or 4B, (e.g., PCs 150, 250, 330, 420, 430, 440, 490, 491, 492 and/or 493). The PCs 550 may generally weaken the film structure 560 in the areas of these PCs 550, and that any and/or all of the details described in other embodiments herein regarding other PCs (e.g., PCs 150, 250, 330, 420, 430, 440, 490, 491, 492 and/or 493) and their characteristics and/or functionalities with respect to other PSs (e.g., PSs 100, 200, 300, 400A and/or 400B) respectively, may also apply to PCs 550 and PS 500. In this way, the PCs 550 may be pressure-activated during the microwave cooking process in order to control or regulate the pressure and heat within the PS 500 during cooking, and may also serve as safety valves.

The PCs 550 may be located or distributed on the film 560 sequentially, intermittently, continuously, in patterns, in any location and/or orientation on the film 560 and any combination thereof. The number and distribution of the PCs 550 on the PS 500 may depend on factors including, without limitation, the external environment, the container type, the container size and weight and the moisture content of the food product that may be located inside the PS 500.

Figure 6:
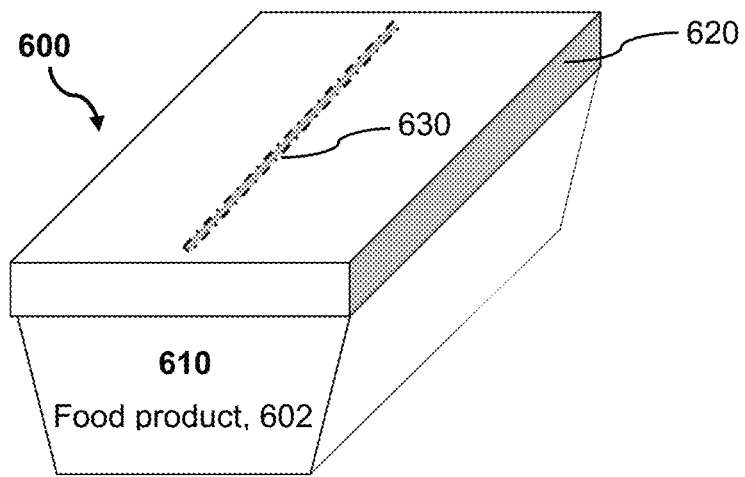
FIG. 6 is a perspective section view of food packaging.

In another exemplary embodiment hereof as shown in FIG. 6, a PS 600 may include a tray 610 or other type of container that may correspond to the tray 510 of FIG. 5, and that may include any of the aspects of the tray 510 as described. The PS 600 may also include a film structure 620 for sealing the tray 610 that may correspond to the film structure 560 of FIG. 5 and that may include any of the aspects of the film structure 560 as described.

In addition, the PS 600 may include one or more continuous PCs 630 that may correspond to the PCs 550 of FIG. 5 and that may include any of the aspects of the PCs 550 as described, but that may extend a longer distance across the film structure 620 compared to the distance a single PC 550 may extend across the film 560. Accordingly, the continuous PCs 630 may be longer than the PCs described in relation to other embodiments of the current invention. As such, a single PC 630 may be equivalent in length to multiple shorter PCs or may provide different venting parameters.

The PS 600 may include any number of PCs 630, in any locations and/or orientations in its film 620.

The continuous PCs 630 may generally weaken the film structure 620 in the areas of these PCs 630, and any and/or all of the details described in other embodiments herein regarding other PCs (e.g., PCs 150, 250, 330, 420, 430, 440, 490, 491, 492, 493 and/or 550) and their characteristics and/or functionalities with respect to other PSs (e.g., PSs 100, 200, 300, 400A, 400B and/or 500) respectively, may also apply to the continuous PCs 630 and PS 600.

As discussed above in connection with other embodiments, the longer continuous PCs 630 may be chosen to provide the desired opening pressure, opening time and/or amount of pressure release. In this way, the continuous PCs 630 may be pressure-activated during the microwave cooking process in order to control or regulate the pressure and heat within the PS 600 during cooking, and may also serve as a safety valve.

Figure 7:
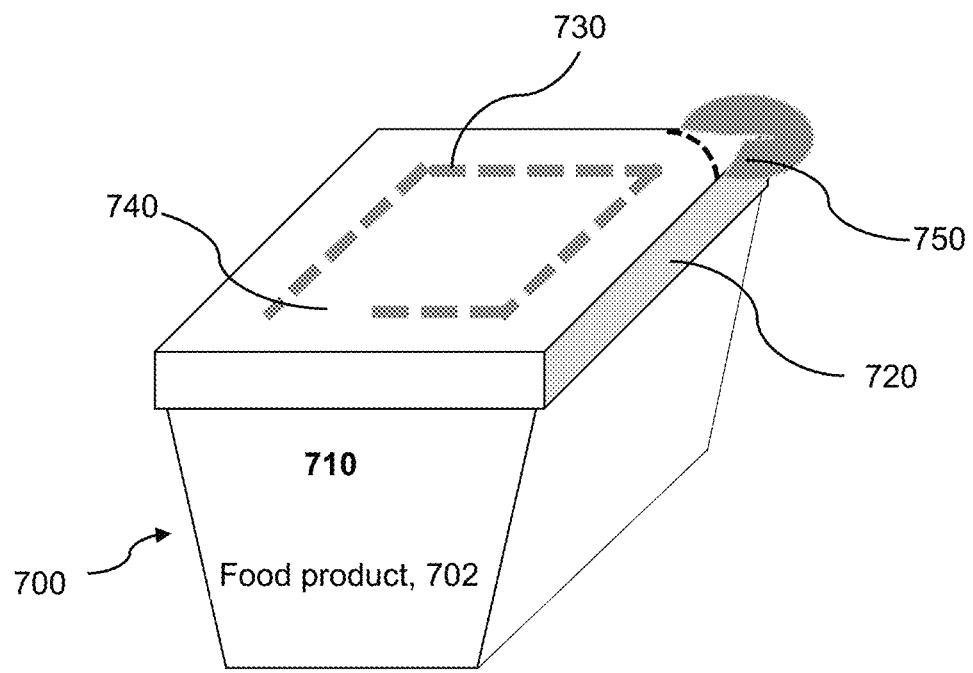
FIG. 7 is a perspective section view of food packaging.

Another preferred embodiment PS 700 of the current invention that may include a peel and reseal feature is shown in FIG. 7. PS 700 may include a non-breathable, microwavable film 720 that is connected (sealed) to a container or tray, such as container 710. The frozen, shelf-stable or vacuum requiring food product 702 is placed in container 710 of the PS 700. The sealable film structure 720 may comprise three layers similar to that shown in FIG. 5, wherein the inner layer 540 is a sealable layer that may be peelable from tray 710 or weld sealed to tray 710. Alternatively, the film 720 may comprise a single layer structure, wherein the layer is a heat sealable layer similar to 540 or a two layered structure. The film 720 of PS 700 may comprise a peelable or easy peel film structure and may include a tab 750 to pull the film 720 away from the tray 710 for easy access to the food product.

The PS 700 may include one or more precision cuts (PC) 730 on film 720 that do not connect the internal atmosphere within the enclosure of container 710 to the external environment, until the pressure within the enclosure 710 equals or exceeds 0.3 psi or some other desired pressure. The PCs 730 act as a safety valve that is activated with increased pressure within the enclosure of PS 700. The PC 730 may be registered to form the desired shape, which may be a continuous cut or intermittent. The non-cut area 740 may prevent the complete separation of the film 720 from container 710 when it is peeled back, thereby aiding the reclosing of the film 720 over the container 710.

The PCs 730 in film 720 of PS 700 may be cut or formed using various technologies and techniques, such as laser, rotary die cut or mechanical punch to any desired shape or size. As with the other embodiments, it is preferred that the PCs are formed so that they are visually closed to the naked eye prior to cooking, or are only nominally open, as viewed under magnification, i.e., effectively closed, so as to not materially affect the respiration feature, prior to cooking.

EXAMPLE SPECIFICATIONS

Example specifications and meaningful parameters of the PSs 100, 200, 300, 400A, 400B, 500 and/or 600, the microperforations 140, 240, 330 and the PCs 150, 250, 330, 420, 430, 440, 490, 491, 492, 493, 550 and/or 630 are now described in relation to the PS 100, the microperforations 140 and the PCs 150. However, it should be noted that the details and aspects described below may also pertain to the PSs 200, 300, 400A, 400B, 500 and/or 600, and the PCs 250, 330, 420, 430, 440, 490, 491, 492, 493, 550 and/or 630.

In all of the embodiments described herein or otherwise, the size and number of the microperforations 140 may be determined based on (i) the per unit weight of perishable fresh food product or inherent water content of the frozen food to the surface area of the base film 101 ratio, (ii) the respiration rate of the fresh food products stored within the PS 100, and/or (iii) the shelf life requirements of the PS and the food product within. The number and size of the microperforations 140 for an embodiment of the packaging system PS 100 may vary. Thus, it is contemplated that the present invention may be used to provide a predetermined shelf-life which may be a maximum shelf life of the fresh and/or frozen food product or a less than maximum shelf life.

In some preferred embodiments hereof, the diameters of the microperforations 140 may be in the range of one micron (1μ) to six hundred microns (600μ), and more preferably from ten microns (10μ) to four hundred fifty microns (450μ). The diameter range of the ACAs 140 may vary depending on the type of food product in the PS 100 and its respiration rates.

The number of ACAs or microperforations 140 included in any given PS 100 may range from one (1) to one thousand (1,000) or more, and more preferably from two (2) to three hundred fifty (350).

The density of microperforations in the film 101 may be determined by the above mentioned parameters (i), (ii) and (iii), and may generally be in the range of one (1) to five hundred (500) holes and is determined based on unit weight (i.e., gram(s), ounce(s), pound(s), and the like) of fresh and/or frozen food product depending on the required open area and the base sheet 101 gas transmission properties. In a preferred implementation, the per unit weight calculation may be based on the unit of weight shown on the package (such as gram(s), ounce(s), pound(s), and the like) of the perishable fresh and/or frozen product contained within.

In addition, the term "open area" may refer to the cumulative amount of open area that extends from the interior enclosure through the base film(s) 101 of the PS 100 to the exterior environment, provided by the microperforations 140. For example, a film 101 having four microperforations 140 may have a total open area defined by the cumulative size (area) of each of the four openings 140. Thus, if each of the four microperforations 140 have a diameter of one hundred microns (100μ) (μ=$10^{-6}$ m), the surface area (open area of the microperforations 140) of each microperforation 140 may be calculated knowing that the surface area=$\pi r^2$, and in this example, $\pi$ multiplied by $(50 \times 10^{-6}$ m$)^2$ or $7.85 \times 10^{-9}$ m. Therefore, the open area provided by the four microperforations may be approximately equal to $3.14 \times 10^{-8}$ m.

The desired open area may be pre-determined based upon the type of perishable food product to be stored within the PS 100, and/or on various alternatives such as a pre-determined number of microperforations, pre-determined respiration rate, pre-determined internal water content of the fresh and/or frozen food and the like, and other considerations. However, it should be noted that the scope of the current invention is not limited to certain cumulative open areas provided by the microperforations 140 that the PS 100 may include.

In addition, because the percentage of open area compared to non-open area on a particular PS 100 may be a parameter of interest, there may be a balance between hole size and hole density. For example, hole density may be calculated as the number of microperforations 140 included in each one square centimeter area around each microperforation 140. In other words, hole density may be viewed as the number of ACAs 140 per square centimeter of the respiration system, which may generally be represented by the area of the base film 101 around where the ACAs 140 are located.

The hole density calculation is generally not based on the entire surface area of the PS 100, but is instead based on the per centimeter square area of that portion of the film 101 where the microperforations 140 are located. For example, if a package has two microperforations 140 that are five centimeters apart, the hole density calculation may involve looking at the one-centimeter film area around each microperforation 140 and then determining density as one microperforation per centimeter square. To this end, for example, the presence of 1 microperforation anywhere on the package indicates an ACA or microperforation 140 density of 1/cm² as the density characteristic is determined by the area around the ACA 140.

In a preferred embodiment, the size and number of the microperforations 140 may be designed to achieve oxygen ($O_2$) levels in the range one-tenth of a percent (0.1%) to eighteen percent (18%) and more preferably less than fifteen percent (15%), carbon dioxide ($CO_2$) levels in the range of one-tenth of a percent (0.1%) to twenty-two percent (22%) and a relative humidity (RH) equal to or greater than fifty percent (50%), and more preferably eighty percent (80%) to one hundred percent (100%).

Another characterization of the PS 100 may include the total gas transmission rate of the base films 101 which may comprise the transmission rate through the base film 101 itself (though the film 101 may be inherently slightly gas permeable in the non-microperforated areas) plus the transmission rate through the microperforations 140 or the like. The total gas transmission rate of oxygen for the PS 100 may preferably be one or more cubic centimeters per 100 square inches per day, and preferably 10 or higher, and more preferably thirty or higher. The rate of transmission of oxygen for the PS 100 may preferably be 50,000 or less cubic centimeters per 100 square inches per day, and preferably 10,000 or less, and more preferably 1000 or less.

In addition, the total gas transmission rate of carbon dioxide for the PS 100 may preferably be 5 or more cubic centimeters per 100 square inches per day, and preferably 20 or more, and more preferably 50 or more. The rate of transmission of carbon dioxide for the PS 100 may preferably be 200,000 or less cubic centimeters per 100 square inches per day, and preferably 50,000 or less, and more preferably 5,000 or less.

Also, the total transmission rate of water vapor for the PS 100 may preferably be 0.01 or more cubic centimeters per 100 square inches per day, and preferably 0.05 or more, and more preferably 0.1 or more. The rate of transmission of water vapor for the PS 100 may preferably be 500 or less cubic centimeters per 100 square inches per day, and preferably 200 or less, and more preferably 100 or less.

Furthermore, another meaningful parameter of the PS 100 may include the size (e.g., the width and/or length) of PCs 150 in the base films 101 of the food package. In a preferred embodiment, the total width of each PC 150, e.g., the width of the laser cut in the innermost layer 130 as shown in FIG. 1B, may be 0.01 mm or more, and preferably 0.1 mm or more, and more preferably 0.25 mm or more. However, other widths of PCs 150 may also be used. The total length of each PC 150, e.g., the length of the PCs 150 as may be determined by the distance the laser travels along the film 101 when forming the PCs 150 in the innermost layer 130 as shown in FIG. 1C, may be 500 mm or less, and preferably 50 mm or less, and more preferably 15 mm or less, but other PC lengths may be used. (It should be noted that the dimensions of PCs 150 shown in FIGS. 1B and 1C are not to scale when compared to FIG. 1A, which shows the length of the PCs 150 to be larger than their width.) In some embodiments, the length of PCs 150 may run throughout the length or width of the bag or in registered areas of the bag, where registered areas generally refers to certain regions of the PS 100 where PCs 150 may be located.

The number of PCs 150 included in any given PS 100 may range from one (1) to five hundred (500) or more; more preferably from one (1) to twenty (20) or more and more preferably (1) to fifty (50) or more. The density at which the PCs 150 are formed may be determined similarly to how microperforation density is determined, i.e., by considering the area around where the PCs 150 are located. PC density may vary, for example, according to steam cooking parameters of particular food products.

It should be noted that the examples of microperforation sizes, densities and locations, the open area, the gas transmission rates, the levels of $O_2$, $CO_2$ and RH, and the width and lengths of the PCs 150 are meant for demonstration and that other values for these parameters may also be used. To this end, the scope of parameters of the PS 100 is not limited in any way by the values of these parameters as described herein.

In Use

In some exemplary embodiments hereof, perishable and/or respiring food products (e.g., fruits, vegetables, meats and other types of food products), both frozen and/or non-frozen, may be packaged and stored in a modified atmosphere packaging system (MAP) for extended shelf life, and subsequently cooked within the PS 100 using a microwave oven by following the steps:

Step 1: Providing a packaging system 100 (PS) comprising at least in part a film structure and an inner volume in which food products may be stored;

Step 2: Providing at least one microperforation 140 extending entirely through the film structure, from the inner enclosure 103 where the food product may ultimately be stored to the outside environment outside the PS 100;

Step 3: Providing at least one precision cut 150 (PC) (or channel) that may extend from the surface facing the inner volume where the food may ultimately be stored, partially through the film structure comprising one or more film layers (but not all the way through the film structure);

Step 4: Placing the perishable and/or respiring food product within the inner enclosure 103 of the PS 100 and properly sealing the PS 100;

Step 5: Storing the PS 100 during which time the microperforations 140 may control the composition levels of $O_2$, $CO_2$, $C_2H_4$, water vapor and other gasses within the atmosphere of the inner enclosure 103 surrounding the food product thereby extending the shelf life of the food product;

Step 6: Subsequently cooking the food product within the PS 100 by placing the PS 100 into a microwave oven and cooking the PS 100, during which time the PCs 150 may activate (e.g., split the film 101 open where the PCs 150 are located) due to increased pressure within the inner volume of the PS 100, thus allowing excess steam and/or pressure to be released, and during which the activated PCs 150 may also regulate the pressure within the PS 100 during the pressure cooking process to ensure that the food product is properly cooked; and Step 7: Removing the PS 100 from the microwave oven for consumption of the cooked food within.

It is understood by a person of ordinary skill in the art that the steps described above are meant for demonstration purposes and that other steps may be taken, not all of the steps described must be taken, and that the steps may be taken in different order. It is also understood that the scope of the PS 100 is not limited in any way by the steps described above, by any steps not described or by the order in which the steps may be taken. For example, food products that are high in moisture, fat and liquid food may generally need a non-breathable film structure (food oxidation control system) that has low oxygen transmission and devoid of open perforations prior to cooking, but yet allowing the cooking of the food in the microwave oven. In this case, Steps 2 and 5 will not be applicable. The non-breathable film structure (food oxidation control system) may have a gas transmission rate of oxygen from 0 to 100 cubic centimeters per 100 square inches per day. An embodiment of the current invention involving a non-breathable film structure may be particularly suited for frozen and/or non-respiring food products.

EXAMPLES

The packaging systems of the current invention are now further described by the following examples. The various PS embodiments described herein may include all, some or none of the aspects or specific features described in the examples. As such, the scope of the current invention is not limited in any way by the aspects of the packaging systems described in the examples.

Some of the following examples compare the performance of the current invention's use of breathable, microwavable films as part of a package system (PS) for the storing and cooking of respiring and/or perishable food products against a control packaging structure. The PS may include microperforations and/or precision cuts (PCs) as described above, while the control packaging structure may not. Other examples below describe the performance of the current invention without comparison to a control structure. In both cases, the benefits of the PS of the current invention are described.

Example 1A

In a first example, the shelf life of broccoli florets packed in a PS comprising a 3.0 mil thick bottom-gusseted bag containing microperforations and precision cuts (PCs) is compared to the shelf life of similar broccoli florets packed in a control packaging structure. The PS included thirty 180 µm-diameter microperforations and five quarter-inch long PCs. The positions of the microperforations and the PCs were configured to allow continued functionality from packing of the food into the PS until consumption by the consumer. The control structure did not include microperforations or PCs. Both packages were sealed using an industrial heat sealer (e.g., from Sencorp systems Inc., Hayannis, Mass.).

In this example, approximately one pound of broccoli was packed into each of the PS and the control package, and both packages were held at 5° C. and studied. In a second phase of this first example using a second set of a PS and a controlled packaging identical to the first set, approximately one pound of broccoli was packed into each of the PS and the control package, and both packages were held at 22° C. and studied. The results of the tests are shown in Table 1 below:

TABLE 1

|  | Storage at 5° C. | Storage at 22° C. |
|---|---|---|
| Control Package | Bloating was observed after two days. Upon opening, a strong off-flavor aroma was noticed indicating fermentation. | Bloating was observed within 24 hours. Upon opening, a strong off-flavor aroma was noticed indicating fermentation. |
| Packaging System of Current Invention | Florets remained green and quality maintained for 21 days. | Florets remained green and quality maintained for 6 days. |

Example 1B

In a second example, the cooking capabilities and resulting safety of the PS and the control structure of Example 1A were compared. The PS and the control structure were again each packed with approximately one pound of broccoli florets and sealed. Both bags were then microwave cooked for three minutes each using a 1000 W Hamilton Beach microwave.

During the microwave cooking process, the PCs on the PS were activated as described above and acted as safety valves by releasing pressure and steam at the prescribed psi within the bag. The PCs also regulated the pressure within the PS in order to cook the broccoli at the proper pressure and heat.

After cooking, the PS was removed from the oven and observed under microscope at 380× using a M40 Metallurgical Microscope, mounted with 3.0 MP Infinity digital camera. Observations showed that three of the five PCs were fully opened (fully activated), one PC was partly open (partially activated) and one PC remained intact.

In addition, the broccoli within the PS was removed and observed to be properly cooked.

On the other hand, during the cooking of the control package, the control bag fully inflated at around the two-minute point and subsequently burst due to the increased pressure within the bag. The control bag was removed and found to be burst open near its gusset seals.

Example 2A

In another example, the shelf life of butternut squash spirals packed in a PS comprising a 2.5 mil thick bottom gusseted bag containing microperforations and precision cuts (PCs) is compared to the shelf life of similar butternut squash spirals packed in a control packaging structure. The PS included eleven (11) 100 μm-diameter microperforations and seven quarter-inch long PCs. The positions of the microperforations and the PCs were configured to allow continued functionality from packing of the food into the PS until consumption by the consumer. The control structure did not include microperforations or PCs. Both packages were sealed using an industrial heat sealer (e.g., from Sencorp systems Inc., Hayannis, Mass.).

In this example, approximately ten (10) ounces of butternut squash spirals were packed into each of the PS and the control package, and both packages were held at 5° C. and studied. In a second phase of this third example using a second set of a PS and a controlled packaging identical to the first set, approximately ten (10) ounces of butternut squash spirals were packed into each of the PS and the control package, and both packages were held at 22° C. and studied. The results of the tests are shown in Table 2 below:

TABLE 2

|  | Storage at 5° C. | Storage at 22° C. |
|---|---|---|
| Control Package | Bloating was observed after three days. On opening, a strong off-flavor aroma was noticed indicating fermentation. | Bloating was observed within 36 hours. Upon opening, a strong off-flavor aroma was noticed indicating fermentation. White yeast growth was also observed. |
| Packaging System of the Current Invention | Product remained good for 21 days. The texture was crunchy. | Product degraded from yeast growth after 60 hours of storage. No bloating was observed. |

Example 2B

In another example, the cooking capabilities and resulting safety of the PS and the control structure of Example 2A were compared. The PS and the control structure were again each packed with approximately ten ounces of butternut squash spirals and sealed. Both bags were then microwave cooked for three minutes each using a 1000 W Hamilton Beach microwave.

During the microwave cooking, the PCs on the PS were activated as described above and acted as safety valves by releasing pressure and steam at the prescribed psi within the bag. The PCs also regulated the pressure within the PS in order to cook the butternut squash spirals at the proper pressure and heat.

After cooking, the PS was removed from the oven and observed under microscope at 380× using a M40 Metallurgical Microscope, mounted with 3.0 MP Infinity digital camera. Observations showed that five of the seven PCs were fully opened (fully activated), and two PCs were partly open (partially activated).

In addition, the butternut squash spirals within the PS were removed and observed to be properly cooked.

On the other hand, during the cooking of the control package, the control bag fully inflated at around the one-minute thirty-seconds point and subsequently burst due to the increased pressure within the bag. The control bag was removed and found to be burst open near its gusset seals.

Example 3A

In another example, the shelf life of a riced veggie mix, containing cauliflower, broccoli and carrot packed in a PS comprising a PP tray measuring 6.8 in. wide by 7.0 in. long by 6 in. in height is compared to the shelf life of similar riced veggie mix packed in a similar PP tray control packaging structure. The PS was sealed using a composite film of the current invention that included fourteen (14) 150 μm-diameter microperforations and four quarter-inch long PCs. The control package was sealed with a film that did not include microperforations or PCs. Both trays were sealed using a tabletop tray sealing machine ER-900 with appropriate collar. The positions of the microperforations and the PCs were configured to allow continued functionality from packing until consumption.

In this example, approximately eight (8) ounces of the riced veggie mix were packed into each of the PS and the control package, and both packages were held at 5° C. and studied. In a second phase of this example using a second set of a PS and a control package identical to the first set, approximately eight (8) ounces of the riced veggie mix were packed into each of the PS and the control package, and both packages were held at 22° C. and studied. The results of the tests are shown in Table 3 below:

TABLE 3

|  | Storage at 5° C. | Storage at 22° C. |
| --- | --- | --- |
| Control Package | Bloating was observed after two days. Upon opening, a strong off-flavor aroma was noticed indicating fermentation. | Bloating was observed in 24 hours. Upon opening, a strong off-flavor aroma was noticed indicating fermentation. |
| PS | Quality maintained for 21 days. | Quality was acceptable for 6 days. |

Example 3B

In another example, the cooking capabilities and resulting safety of the PS and the control structure of Example 3A were compared. The PS and the control structure were again each packed with approximately eight (8) ounces of the riced veggie mix and sealed. Both trays were then microwave cooked for three minutes each using a 1000 W Hamilton Beach microwave.

During the microwave cooking, the PCs on the PS lidding film were activated as described in other sections and acted as safety valves by releasing pressure and steam at the prescribed psi within the bag. The PCs also regulated the pressure within the PS in order to cook the riced veggie mix at the proper pressure and heat.

After cooking, the PS was removed from the oven and observed under microscope at 380× using a M40 Metallurgical Microscope, mounted with 3.0 MP Infinity digital camera. Observations showed that all seven of the seven PCs were fully opened (fully activated).

In addition, the riced veggie mix within the PS were removed and observed to be properly cooked.

On the other hand, during the cooking of the control tray, the control film lidding tore from the control tray's edges at around the two-minute ten-seconds point due to the increased pressure within the tray.

Example 4

In another example, the shelf life and microwave cooking results of apple slices sprinkled with sugar and cinnamon and packed in a PS comprising a 2.5 mil gusseted oxygen transmission rate (OTR) specific bag including precision cuts (PCs) were evaluated. The OTR specific bag comprised a PE and PP laminate structure with a final OTR of 140 cc/day. While the PS of the current invention shown in this example is specific to fresh apple slices, bags from film structures that provide a rate of transmission of oxygen of 1 to about 850 cubic centimeters per 100 square inches per day, and more preferably, about 20 to about 850 cubic centimeters per 100 square inches per day may be constructed for other low respiring food products. The PS included ten PCs, each one-quarter inch in length.

Approximately twelve ounces of apple slices were packed in the PS and the package was sealed using an industrial heat sealer (Sencorp systems Inc., Hayannis, Mass.). The PS was then held at 5° C. and studied. The results showed that the apple slices retained quality in the PS for 21 days without any quality issues.

After 21 days the product was microwave cooked in the PS bag for four minutes using a 1000 W Hamilton Beach microwave oven. The PCs in the PS activated as described above and acted as safety valves by releasing pressure on bag inflation. The PCs also regulated the pressure within the PS in order to cook the apple slices at the proper pressure and heat.

After cooking, the PA bag was removed from the microwave oven and the PCs in the bag were visualized under 380× magnification using a M40 Metallurgical Microscope, mounted with 3.0 MP Infinity digital camera. Observations showed that seven out of the ten PCs were fully opened (activated) and three of the PCs were partly open (partly activated).

In addition, the apple slices within the PS were removed and observed to be properly cooked.

Example 5

In another example, the shelf life and microwave cooking results of seasoned mixed shredded cabbage packed in a PS comprising a 2.5 mil gusseted containing microperforations and precision cuts (PCs) were evaluated. The PS bag comprised a three-layered PE based co-extruded structure. The PS included twenty-five 30 μm-diameter microperforations and five PCs, each 0.15 inches in length. The positions of the microperforations and PC were configured to allow continued functionality from packing until consumption.

Approximately ten (10) ounces of the seasoned mixed shredded cabbage were packed in the PS and the package was sealed using an industrial heat sealer (Sencorp systems Inc., Hayannis, Mass.). The PS was then held at 5° C. and studied. A second and identical PS was also packed with approximately ten ounces of the seasoned mixed shredded cabbage, sealed and held at 22° C. and studied. The results showed that the seasoned mixed shredded cabbage retained quality in the PS for 23 days without any quality issues.

After 23 days the product was microwave cooked in the PS bag for four minutes using a 1000 W Hamilton Beach microwave oven. The PCs in the PS activated as described above and acted as safety valves by releasing pressure upon bag inflation. The PCs also regulated the pressure within the PS in order to cook the apple slices at the proper pressure and heat.

After cooking, the PS bag was removed from the microwave oven and the PCs in the bag were visualized under 380× magnification using a M40 Metallurgical Microscope, mounted with 3.0 MP Infinity digital camera. Observations showed that all five of the PCs were fully opened (activated) and that the food product was cooked safely within the PS.

In addition, the seasoned mixed shredded cabbage within the PS was removed and observed to be properly cooked.

Example 6

The next example demonstrates the different pressures required to activate similar PCs on different types of PSs, and the effectiveness of the PCs as safety valves maintaining package integrity without bursting. Three different types of bags were used for the test: a C-fold bag, a pillow bag with back fin seal and a doy bag. Each type of bag was individually tested with one PC, two PCs, ten PCs.

Using a Mocon Skye 2000a package test system (Brooklyn Park, Minn.), each PS was internally pressurized with compressed air until its PCs were activated to release pressure. During this process, the packages were restrained using plates to ensure that the stress was applied uniformly through the package.

The pressure at which at least one PC opened either fully or partially to release internal pressure thus preventing the package from bursting, was noted as the peak pressure. (The opening of any structural seals on the PS prior to one or more PCs opening would be considered a failure of the package.) In the tests, no structural seals of the PSs opened during the test. The results are shown in Table 4 below.

TABLE 4

| No. of PCs in the package | Peak Pressure, psi C-fold bags | Peak Pressure, psi Fin seal bag | Peak Pressure, psi Doy bag |
|---|---|---|---|
| 1 | 1.8 | 1.1 | 1.4 |
| 2 | 0.9 | 1.0 | 0.8 |
| 3 | 1.9 | 1.6 | 1.1 |
| 4 | 1.5 | 1.3 | 1.4 |
| 5 | 0.6 | 0.3 | 1.0 |
| 6 | 1.7 | 1.1 | 1.3 |
| 7 | 2.2 | 0.8 | 1.5 |
| 8 | 1.4 | 0.9 | 0.3 |
| 9 | 2.3 | 1.2 | 0.6 |
| 10 | 2.2 | 1.1 | 0.8 |

Example 7

The next example compares the effectiveness of PCs when placed in the front of the PS vs. the back of the PS; and the top of the PS vs. bottom of the PS. The test was conducted similar to the method described in Example 6. The results shown in Table 5 below demonstrate that the functionality of the PCs as a safety valve did not change, irrespective of their positions in the bag.

TABLE 5

| Position of PC | Peak Pressure, psi C-fold bags | Peak Pressure, psi Fin seal bag | Peak Pressure, psi Doy bag |
|---|---|---|---|
| Front of Bag | 0.6 | 0.3 | 1.0 |
| Back of Bag | 1 | 0.7 | 1.3 |
| Top of Bag | 1.4 | 1.5 | 1.7 |
| Bottom of Bag | 1.2 | 0.9 | 1.1 |

Example 8

The next example compares the effectiveness of the PCs in two different package materials. The first package material was a bottom gusseted bag of 2.5 mil thickness and made with a laminated structure, wherein the inner layer was clear poly propylene and the outer layer was reverse printed PET. The second package was a similar bag made with a 3.0 mil structure, wherein the inner layer was clear PE laminated to the outer layer of reverse printed PET. Each bag had ten (10) 130 µm-diameter microperforations for breathability, and five (5) PCs on the back of each bag.

The pressure test was conducted similar to the method detailed in Example 6. Five bags of each packaging material were tested, and the results showed that peak pressure for the polypropylene laminate film varied from 1.5 psi to 3.7 psi, while the peak pressure for polyethylene laminate film varied from 0.3 psi to 2.3 psi.

Example 9

This example demonstrates the effect of including PCs on non-breathable film used for the storage and cooking of frozen food product. Approximately twelve (12) ounces of frozen broccoli florets with cheese sauce was packed in a pillow pack containing eight (8) PCs. The product was cooked for eight minutes using a 1000 W Hamilton Beach microwave oven. The PCs in the bags acted as safety valves and released pressure upon bag inflation and the food product was cooked safely without the package bursting or the product spilling.

The bag was then taken from the microwave oven, and the PCs in the bag were visualized under 380× magnification using a M40 Metallurgical Microscope, mounted with a 3.0 MP Infinity digital camera. Observations showed seven out of the eight PCs were fully opened (fully activated) and one of the PCs was partly open (partly activated) to release pressure.

Example 10

In this example, a frozen protein blend, twelve ounces in weight, containing red rice, quinoa, broccoli and carrot, was packed in thermoformed PE trays and sealed with a composite film according to an embodiment of the current invention (PS film). Sealing was carried out using a table-top tray sealing machine ER-900 with an appropriate collar. The PS film included ten PCs, each 0.2 inches in length in two layers. The positions of the PCs were configured to allow pressure release without damage to the packaging structural seals.

The product was cooked for six minutes using a 1000 W Hamilton Beach microwave. The PCs in the PS bags acted as safety valves and released pressure upon excess pressure buildup in the packaging system. The product cooked safely without damage to structural seals, film or the tray. The film was removed after cooking and the PCs were observed under 380× magnification using a M40 Metallurgical Microscope, mounted with 3.0 MP Infinity digital camera. Observations showed that eight out of the ten PCs were fully opened (fully activated) and one of the PCs was partly open (partly activated) to release pressure. It is understood by a person of ordinary skill in the art, upon reading this specification, that any of the aspects, elements and/or details of any of the embodiments described herein or otherwise may be combined in any way, and that the scope of the invention includes any combinations of any aspects, elements or details of any of the embodiments hereof.

Those of ordinary skill in the art will appreciate and understand, upon reading this description, that embodiments hereof may provide different and/or other advantages, and that not all embodiments or implementations need have all advantages.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A package for steam cooking food in a microwave, comprising:
   a multi-layer film structure which forms an enclosure in which the food is contained;
   a respiration system including one or more atmosphere control attributes (ACA) that are formed in the film structure, that extend all the way through the film structure from the enclosure to the environment outside the package, that are open prior to a microwave steam cooking operation, and that reduce the respiration of the food prior to the microwave cooking operation by allowing the transmission of gases between the enclosure and the environment outside the package through the one or more ACAs, thereby altering the atmosphere in the enclosure; and
   a steam venting system including a plurality of steam vents that are formed in the film structure, that remain closed prior to the microwave steam cooking operation by extending a depth that is less than entirely through a thickness of the film structure, and that open up to release pressure in the enclosure created during the microwave steam cooking process,
      wherein the film structure comprises at least one adhesive including one or more of the plurality of steam vents extending a depth that is less than entirely through a thickness of the at least one adhesive and at least one of the plurality of steam vents at least partially overlaps with at least one of the one or more atmosphere control attributes.

2. The package of claim 1, wherein the one or more steam vents are precision cuts that are visually closed prior to the microwave steam cooking operation.

3. The package of claim 2, wherein the precision cuts are formed by a laser, rotary die cut or mechanical punch.

4. The package of claim 2, wherein the precision cuts are formed having a length, shape, width or other characteristics of the package.

5. The package of claim 2, wherein the precision cuts are in registered areas on the film structure of the package.

6. The package of claim 1, wherein the ACAs comprise microperforations.

7. The package of claim 1, wherein the film structure comprises at least one of monolayer plastics and coextruded plastics.

8. A package for steam cooking food in a microwave, comprising:
- a multi-layer film structure which forms an enclosure with an innermost layer adjacent to the food therein contained;
- a respiration system including one or more atmosphere control attributes (ACA) that are formed in the film structure, that extend all the way through the film structure from the enclosure to the environment outside the package, that are open prior to a microwave steam cooking operation, and that reduce the respiration of the food prior to the microwave cooking operation by allowing the transmission of gases between the enclosure and the environment outside the package through the one or more ACAs, thereby altering the atmosphere in the enclosure; and
- a steam venting system including a plurality of steam vents that are formed in the film structure, that remain closed prior to the microwave steam cooking operation by extending a depth that is less than entirely through a thickness of at least one layer of the film structure, and that open up to release pressure in the enclosure created during the microwave steam cooking process,
  - wherein the film structure comprises at least one adhesive including one or more of the plurality of steam vents that extend a depth that is less than entirely through a thickness of the at least one adhesive and operationally couple upon the microwave steam cooking operation.

9. The package of claim 8, wherein the film structure comprises at least one of multiple monolayer plastics and co-extruded plastics.

10. The package of claim 9, wherein the film structure comprises at least one laminated layer including at least one steam vent extending a depth that is less than entirely through a thickness of the at least one laminated layer.

11. The package of claim 8, wherein at least one steam vent is formed in the innermost layer and at least one other layer of the film structure.

12. The package of claim 8, wherein the one or more steam vents are precision cuts that are visually closed prior to the microwave steam cooking operation.

13. The package of claim 8, wherein the ACAs comprise microperforations.

14. A package for steam cooking food in a microwave, comprising:
- a multi-layer film structure which forms an enclosure in which the food is contained;
- a respiration system including one or more atmosphere control attributes (ACA) that are formed in the film structure, that extend all the way through the film structure from the enclosure to the environment outside the package, that are open prior to a microwave steam cooking operation, and that reduce the respiration of the food prior to the microwave cooking operation by allowing the transmission of gases between the enclosure and the environment outside the package through the one or more ACAs, thereby altering the atmosphere in the enclosure; and
- a steam venting system including a plurality of steam vents that are formed as precision cuts in the film structure, that remain visually closed prior to the microwave steam cooking operation by extending a depth that is less than entirely through a thickness of the film structure, and that open up to release pressure in the enclosure created during the microwave steam cooking process,
  - wherein the film structure comprises at least one adhesive including one or more of the plurality of steam vents that extend a depth that is less than entirely through a thickness of the at least one adhesive and at least one laminate including one or more of the plurality of steam vents extending a depth that is less than entirely through a thickness of the at least one laminate,
  - wherein at least one of the one or more of the steam vents in at least one of the adhesive and laminate at least partially overlaps with at least one of the one or more atmosphere control attributes.

15. The package of claim 14, wherein the film structure comprises at least one of monolayer plastics and coextruded plastics.

16. The package of claim 14, wherein the precision cuts are formed by a laser, rotary die cut or mechanical punch.

17. The package of claim 14, wherein the precision cuts are formed having a length, shape, width or other characteristics of the package.

18. The package of claim 14, wherein the precision cuts are in registered areas on the film structure of the package.

19. The package of claim 14, wherein the ACAs comprise microperforations.

20. The package of claim 8, wherein the film structure comprises at least one laminated layer including at least two steam vents extending a depth that is less than entirely through a thickness of the at least one laminated layer and operationally couple upon the microwave steam cooking operation.

* * * * *